United States Patent [19]

Kurosawa et al.

[11] Patent Number: 5,452,539

[45] Date of Patent: Sep. 26, 1995

[54] METHOD OF CARRYING RATS AND APPARATUS FOR TRAPPING RATS

[75] Inventors: Toshishige Kurosawa, Tokyo; Satoru Ishizaka, Yokohama; She Rin, Chiba; Mutsumi Tanaka, Tanashi, all of Japan

[73] Assignee: Ikari Corporation, Tokyo, Japan

[21] Appl. No.: 295,260

[22] Filed: Aug. 24, 1994

[51] Int. Cl.$^6$ ................................................. A01M 23/08
[52] U.S. Cl. ................................................. 43/58; 43/61
[58] Field of Search ..................................... 43/58, 61, 60, 43/64, 99

[56] References Cited

U.S. PATENT DOCUMENTS

| | | | |
|---|---|---|---|
| 3,591,972 | 7/1971 | Hess | 43/58 |
| 4,566,218 | 1/1986 | Kurosawa et al. | |
| 4,768,305 | 9/1988 | Sackett | 43/61 |
| 4,965,959 | 10/1990 | Gagne | 43/58 |
| 5,083,704 | 1/1992 | Rounthwaite | 43/58 |

FOREIGN PATENT DOCUMENTS 0159634  7/1990  European Pat. Off. .

*Primary Examiner*—Kurt Rowan
*Attorney, Agent, or Firm*—Flynn, Thiel, Boutell & Tanis

[57] ABSTRACT

A method of carrying rats and an apparatus for trapping rats capable of solving problems of a prior art apparatus by repeatedly using a single carrier during the carriage of a rat. In the course of carrying a rat inside a duct toward a processing site, air flow is generated to move a carrier which pushes and moves the rat to the processing site but the carrier is held so as to be returned to its original position. At this time, another air flow is generate to return the carrier to its original position to prepare for a next trapping operation.

3 Claims, 5 Drawing Sheets

METHOD OF CARRYING RATS AND APPARATUS FOR TRAPPING RATS

BACKGROUND OF THE INVENTION

1. Field of the Invention

The present invention relates to a method for carrying rats to a processing site on air flow and an apparatus for trapping the rats.

2. Prior Art

The applicant proposed a technique to carry a rat by a carrier in a duct on air flow and move the trapped rat to a given position on air flow as disclosed in U.S. Pat. No. 4,566,218 and European Patent No. 0 159 634. In this technique, there are problems in that the carrier is consumed every time a rat is trapped and an accommodating space for accommodating many carriers is needed and inferior supply of the carriers is liable to occur.

SUMMARY OF THE INVENTION

It is therefore an abject of the invention to solve the problem of the prior art and to provide a method of carrying rats and an apparatus for trapping the rats capable of repeatedly utilizing a single carrier for trapping rats.

To achieve the above object, in the course of moving a carrier on air flow to thereby push a rat to a processing site when the rat in a duct is carried to the processing site, a rat alone is moved inside the processing site. Thereafter, air flow is generated to move the carrier backward while the carrier is held in the duct so as to be moved backward, so that the carrier is returned to an original position to prepare for a next trapping operation. Since the carrier can be repeatedly used, it is possible to dispense with many carriers and cases for accommodating the carriers therein and also possible to prevent the carriers from being inferiorly supplied one by one.

DETAILED DESCRIPTION OF THE INVENTION

Figure 1:
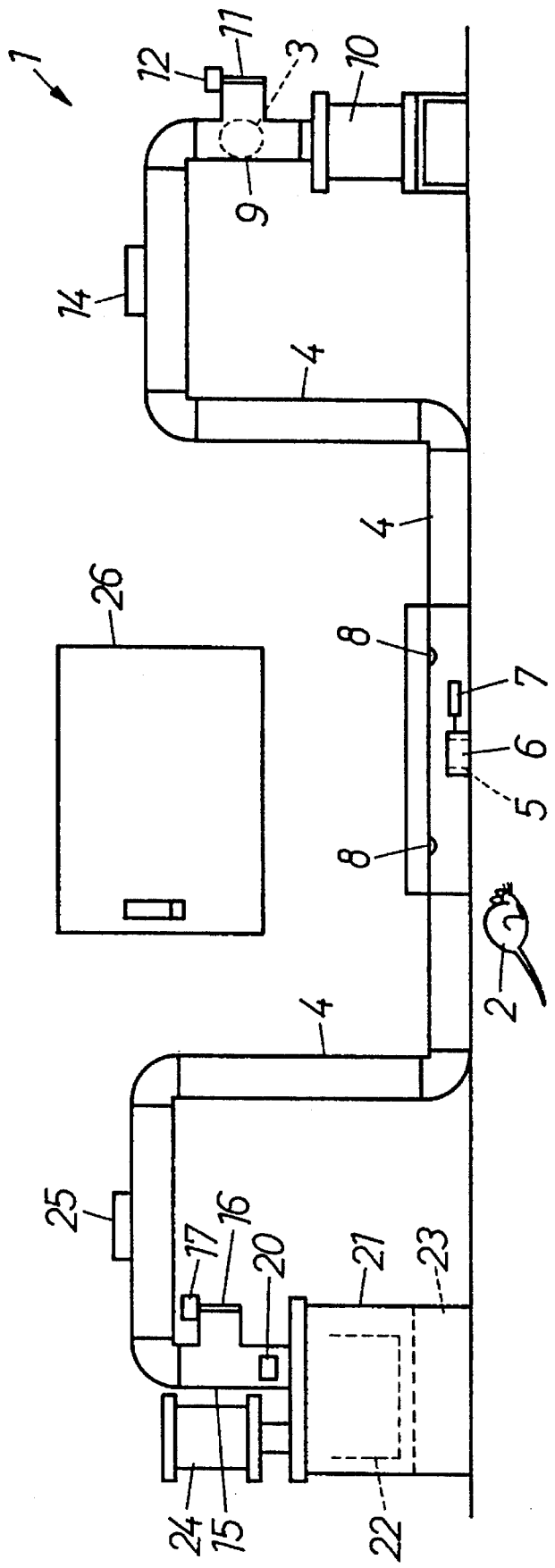
FIG. 1 is a front view of an apparatus for trapping rats according to the present invention.

FIG. 1 shows an entire arrangement of a rat trapping apparatus 1. The rat trapping apparatus I is provided with a duct 4 for guiding and carrying a trapped rat 2 and a spherical carrier 3. An entry opening 5 is formed in the middle portion of the duct 4. A door 6 is positioned at the entry opening 5 and is closable by an operation unit 7. One or more heat sensitive entry sensors 8 are provided at the portion close to the entry opening 5 for detecting the rat; 2 which entered the duct 4. The carrier 3 is formed of a light and soft material and is spherical and it has a diameter which is slightly smaller than an inner diameter of the duct 4.

Figure 2:
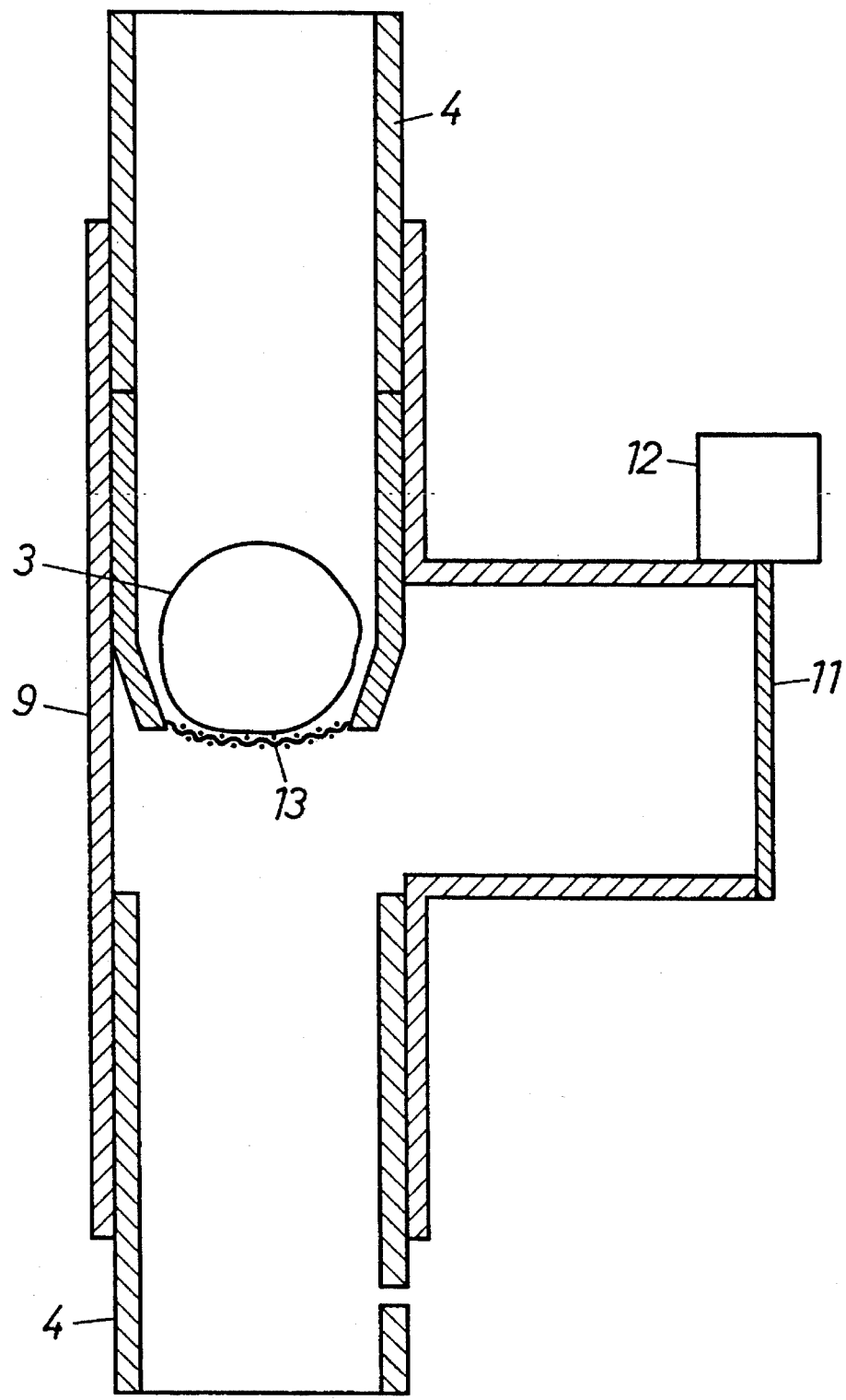
FIG. 2 is a cross-sectional view of an accommodating portion.

There is provided an accommodation portion 9 at one end of the duct 4 for holding the carrier 3 and it is connected to a suction port of a blower 10 for returning the carrier 3. The accommodation portion 9 comprises a T-shaped branch tube provided vertically as shown in FIG. 2 and it has an air valve 11 at one side of thereof. The air valve 11 is closable by an operation unit 12. A dish-shaped metal mesh 13 for holding the carrier 3 is provided inside the accommodation portion 9. A limit switch 14 is attached to the duct 4 at the portion close to an inlet of the accommodation portion 9.

Figure 3:
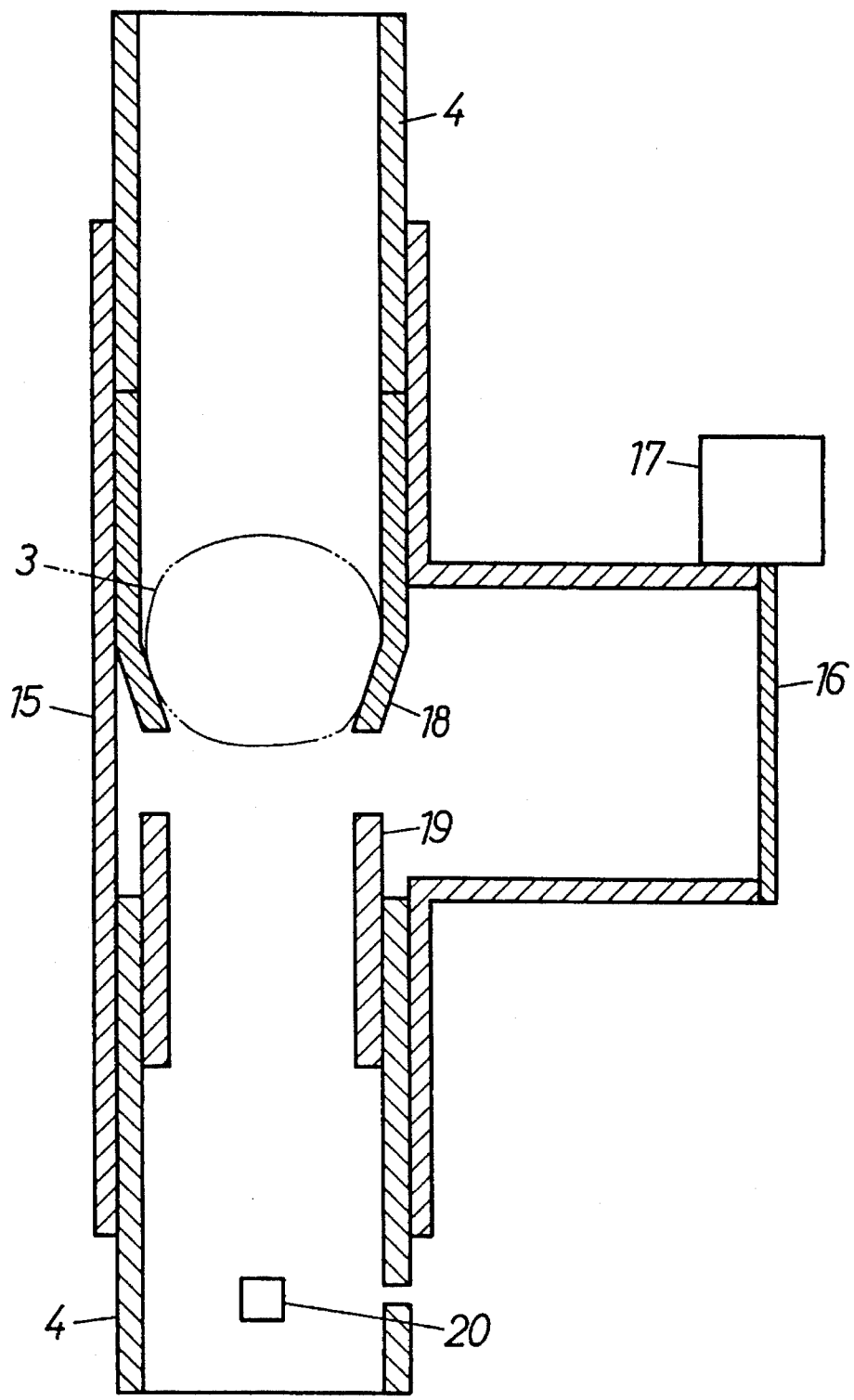
FIG. 3 is an enlarged cross sectional view of a separation portion.

A separation portion 15 is provided at the other end of the duct 4 for permitting the rat 2 alone to pass therethrough. The separation portion 15 comprises a T-shaped branch tube as shown in FIG. 3 and is vertically provided for acting gravity upon the rat 2 when the rat 2 is carried. An air valve 16 is provided at one side of the separation portion 15 and it is closable by an operation unit 17.

There are provided inside the separation portion 15 a throttle portion 18 having an effective diameter which is smaller than the carrier 3 for permitting the rat 2 alone to pass therethrough and a small diameter portion 19 which does not continue from the throttle portion 18. A photosensor type rat trap sensor 20 is attached to the inside of the separation portion 15 at the lower portion thereof. An effective opening area of the throttle portion 18 is set to be substantially the same as that of the entry opening 5. An area of an air inlet portion defined between the throttle portion 18 and the small diameter portion 19 is set to be substantially the same as that of the air valve 16.

A processing unit 21 is connected to the separation portion 15 at the lower portion thereof and at the position where the rat 2 passes therethrough. The processing unit 21 contains therein an inner box 22 and a gas injection/refrigerator unit 23, described later. The inner box 22 accommodates therein the trapped rat 2 and it can be taken out from the processing unit 21. The gas injection/refrigerator unit 23 is a combination of a suffocating gas injection unit for suffocating the trapped rat 2 or a refrigerator in which antifreeze solution is contained for freezing and killing the rat 2. It is a matter of course that the suffocating gas injection unit and the refrigerator as set forth above may be used instead of the gas injection/refrigerator unit 23.

To generate air flow in the separation portion 15 for carrying the carrier 3, namely, in a carrying direction, a suction port of a blower 24 is attached to the lower portion of the separation portion 15 or to the processing unit 21 at the state where the processing unit 21 is closed. A limit switch 25 is attached to the duct 4 at the inlet portion of the separation portion 15.

Figure 4:
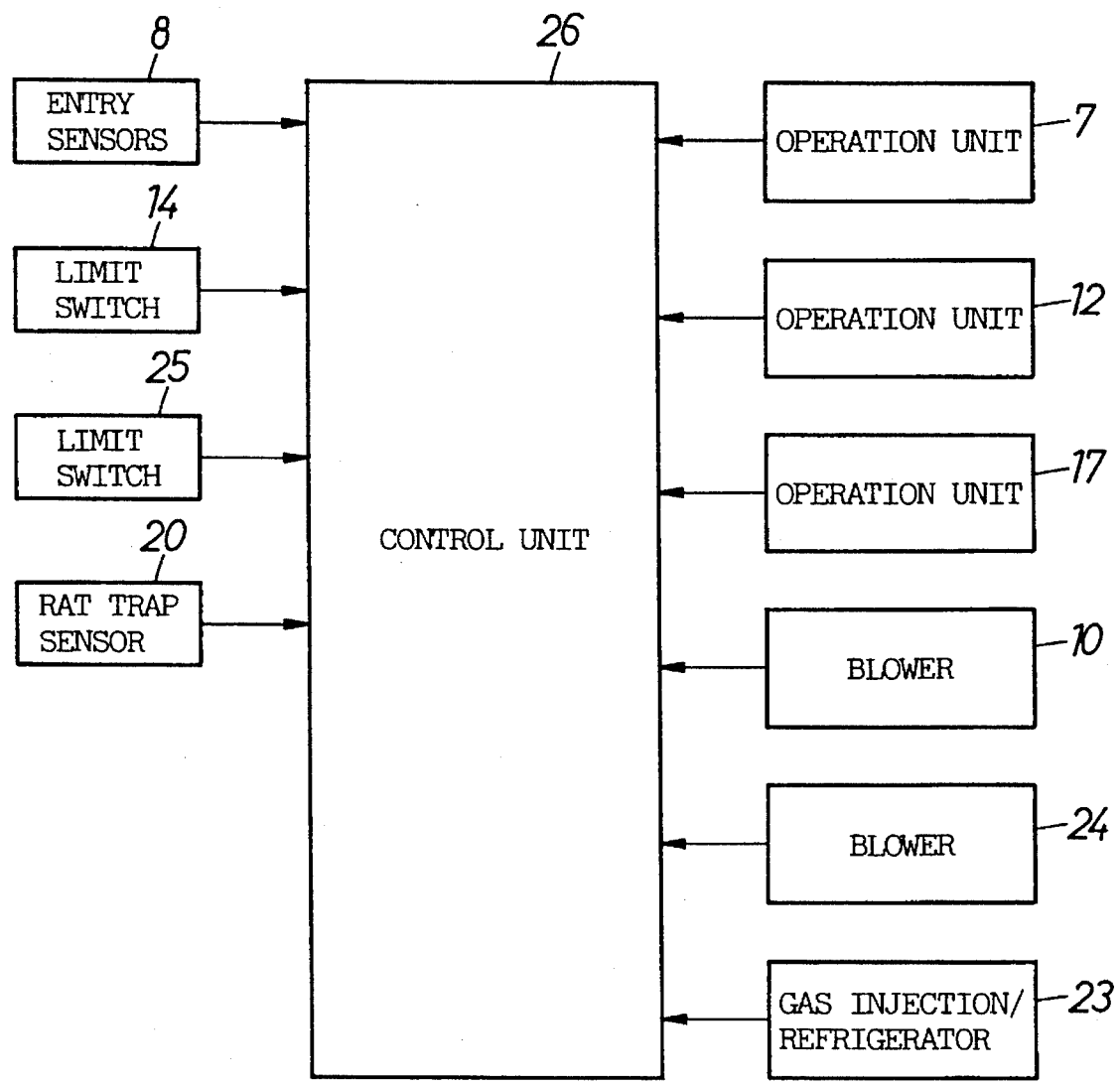
FIG. 4 is a plot diagram showing a control system.

A control unit 26 is illustrated in FIG. 4. The control unit 26 is connected to the entry sensor 8, the limit switches 14, 25, the trap sensor 20 at its input side and it is also connected to the operation units 7, 12 and 17, the blowers 10 and 24, and the gas injection/refrigeration unit 23 at its output side. The control unit 26 executes a series of operation programs in response to an input signal, thereby operates the trap processing.

Figure 5:
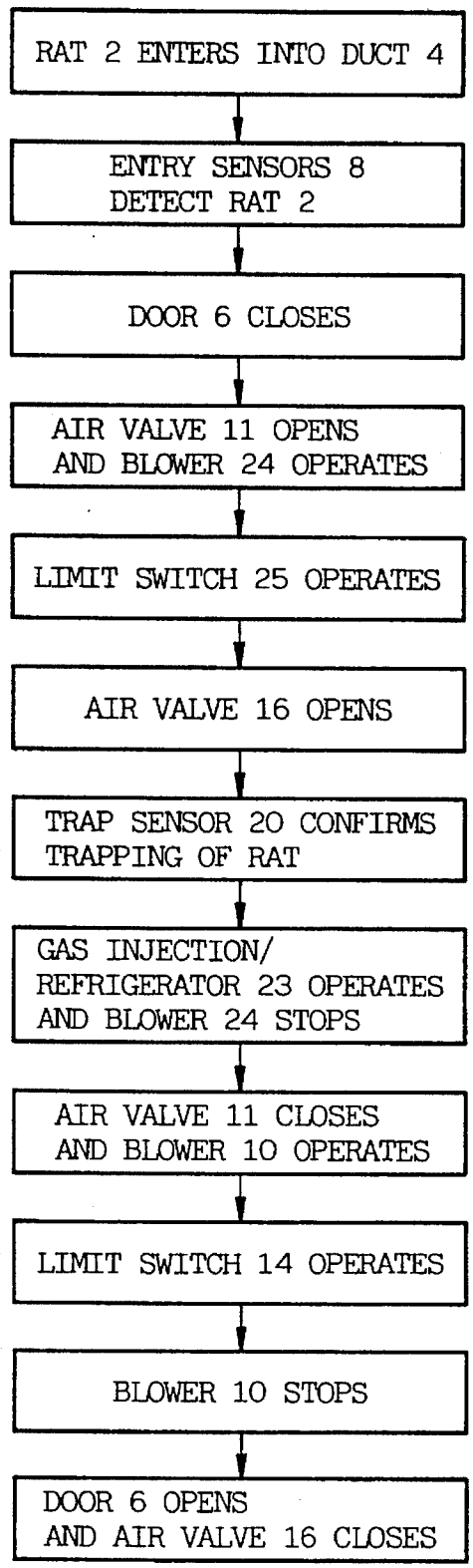
FIG. 5 is a flow chart showing an operation program.

A series of operation programs are illustrated in FIG. 5.

When the rat 2 entered the duct 4 through the entry opening 5 when the door 6 is opened, the entry sensors 8 detect the presence of the rat 2 and issues a signal. In response to the signal from the entry sensors 8, the control unit 26 first drives the operation unit 7 to close the door 6, secondly drives the operation unit 12 to open the air valve 11 and thirdly rotates the motor of the blower 24 so that the blower 24 starts the suction operation. As a result, air flow in the carrying direction is generated inside the duct 4 so that the carrier 3 moves from the accommodation portion 9 to the separation portion 15 for pushing the rat 2 inside the duct 4 and moving the rat 2 toward the separation portion 15.

When the rat 2 and the carrier 3 passed by the limit switch 25, the control unit 26 drives the operation unit 17 of the separation portion 15 so that the air valve 16 is opened to introduce a fresh air from the outside thereinto. As a result, the air flow in the separation portion 15 at the upper side is weakened and the air flow at the lower side is relatively weakened. Consequently, the rat 2 in the duct 4 passes through the throttle portion 18 due to the air flow with assistance of gravity and it drops inside the inner box 22 of the processing unit 21 due to the strong air flow at the lower side of the separation portion 15. At the time when the rat 2 passed through the inside of the separation portion 15, the air valve 16 opens full to introduce the fresh air into the duct 4 so that the suction force of the air is reduced inside the duct 4. As a result, the carrier 3 can not pass through the throttle portion 18 but it is lightly held and stopped by the throttle portion 18.

The trap sensor 20 detects the dropping state of the rat 2 and it confirms that the rat 2 is trapped. Thereafter, the gas injection/refrigerator 23 is operated to thereby suffocate or refrigerate and kill the rat 2 inside the inner box 22.

After the trapping of the rat is confirmed, the control unit 26 stops the suction operation by the blower 24 and closes the air valve 11 and thereafter it operates the blower 10 so that the blower 10 starts the suction operation for generating another air flow to return the carrier 3 in its original position. As a result, the carrier 3 held by the throttle portion 18 is moved inside the duct 4 by another air flow which is opposite to the air flow generated by the blower 24 in its flowing direction and it is returned to its original position and accommodated inside the metal mesh 13 of the accommodation portion 9.

When the carrier 3 passes by the limit switch 14, the limit switch 14 detects the passage of the carrier 3 and issues a detection signal. In response to this detection signal, the control unit 26 stops the suction operation by the blower 10 and opens the door 6 upon confirmation of the returning of the carrier 3 to its original position so as to prepare for a next trapping operation and thereafter it completes a series of operations by closing the air valve 16.

According to the present invention, since the rat 2 alone enters the inside of the trapping apparatus 21 at the separation portion 15 after the carrier 3 moved the rat 2 and the carrier 3 is returned to an original position, the carrier 3 can be recycled, namely, it can be used repeatedly. As a result, there are following effects. Firstly, many carriers are not needed and cases for accommodating many carriers are not needed. Further, the rat trapping apparatus can be incorporated in a small space. Still furthermore, the rat trapping apparatus can be maintained with low cost since expendable supplies are reduced.

What is claimed is:

1. A method of carrying rats in an apparatus for trapping rats comprising a duct, a spherical carrier which is slightly smaller than an inner diameter of the duct, wherein air in the duct is sucked to thereby generate a first air flow in the duct, and wherein said first air flow moves the carrier in the duct in a carrying direction so that a rat is pushed by the carrier to a position close to a processing site, said method comprising the steps of:

introducing a fresh air from an outside of the duct at a throttle portion close to the processing site;

weakening the first air flow at the portion downstream relative to the processing site to thereby permit the rat alone to pass through the throttle portion;

generating a second air flow in the duct which is opposite to the first air flow in its flowing direction after the carrier is held by the throttle portion at the portion upstream relative to the throttle portion; and returning the carrier held by the throttle portion to an original position through the duct.

2. In an apparatus for trapping rats comprising a duct, a spherical carrier which is slightly smaller than an inner diameter of the duct, wherein said duct guides a rat and the spherical carrier, wherein air in the duct is sucked to thereby generate a first air flow in the duct, and wherein said first air flow moves the carrier in the duct in a carrying direction so that a rat is pushed and moved by the carrier to a position close to a processing site and the rat is killed at the processing site, said apparatus further comprising:

a door positioned at the middle portion of the duct for opening an entry opening;

entry sensors for detecting presence of the rat which entered the duct through the entry opening;

an accommodation portion for holding the carrier wherein said accommodation portion is provided at one end of the duct and has an air valve;

a blower connected to the accommodation portion for generating a second air flow which is opposite to the first air flow in its flowing direction for returning the carrier to its original position;

a separation portion provided at the other end of the duct for separating the rat from the carrier, said separation portion having an air valve and a throttle portion for permitting the rat alone to pass therethrough and restraining the carrier from passing therethrough;

a processing unit connected to the portion where the rat passes therethrough;

another blower connected to the separation portion for generating said first air flow in the separation portion in the carrying direction; and a control unit for permitting said another blower to generate the second air flow in the duct in response to an entry signal issued by said entry sensors, opening said air valve at the accommodation portion so that the carrier pushes and moves the rat inside the duct toward the processing unit, opening the air valve at the separation portion to restrain the carrier from passing through the throttle portion when the rat passed through the throttle portion, operating the blower upon confirmation the arrival of the rat at the processing unit and closing the air valve at the accommodation portion to thereby return the carrier to its original position.

3. A rat trapping apparatus according to claim 2, wherein the separation portion is provided vertically in the duct.

* * * * *